United States Patent
Singla

(10) Patent No.: US 9,571,508 B2
(45) Date of Patent: Feb. 14, 2017

(54) SYSTEMS AND METHODS FOR DISTRIBUTED RULE-BASED CORRELATION OF EVENTS

(75) Inventor: Anurag Singla, Cupertino, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 143 days.

(21) Appl. No.: 14/131,805

(22) PCT Filed: Jul. 29, 2011

(86) PCT No.: PCT/US2011/046024
§ 371 (c)(1),
(2), (4) Date: Jan. 9, 2014

(87) PCT Pub. No.: WO2013/019198
PCT Pub. Date: Feb. 7, 2013

(65) Prior Publication Data
US 2014/0165200 A1 Jun. 12, 2014

(51) Int. Cl.
*H04L 29/06* (2006.01)
*G06F 21/56* (2013.01)
*G06Q 10/10* (2012.01)

(52) U.S. Cl.
CPC .......... *H04L 63/1416* (2013.01); *G06F 21/56* (2013.01); *G06Q 10/10* (2013.01)

(58) Field of Classification Search
CPC ......... G06Q 10/10; G06F 21/56; H04L 29/06; H04L 63/1416
See application file for complete search history.

(56) References Cited

U.S. PATENT DOCUMENTS

| | | | |
|---|---|---|---|
| 6,553,425 B1 * | 4/2003 | Shah et al. | 709/245 |
| 7,376,969 B1 * | 5/2008 | Njemanze et al. | 726/22 |
| 7,509,677 B2 | 3/2009 | Saurabh et al. | |
| 7,861,299 B1 | 12/2010 | Tidwell et al. | |
| 9,049,617 B2 * | 6/2015 | Tofighbakhsh | H04L 41/5067 |
| 2002/0152185 A1 | 10/2002 | Jamadagni | |
| 2002/0194495 A1 * | 12/2002 | Gladstone | G06F 21/55 726/22 |
| 2003/0061514 A1 * | 3/2003 | Bardsley | G06F 21/55 726/4 |
| 2003/0225883 A1 | 12/2003 | Greaves et al. | |
| 2004/0015497 A1 | 1/2004 | Swarna et al. | |

(Continued)

OTHER PUBLICATIONS

International Searching Authority, Application No. PCT/US2011/046024, filed Jul. 29, 2011, Search Report and Written Opinion, 8pp, dated Mar. 20, 2012.

*Primary Examiner* — Dao Ho
*Assistant Examiner* — Cheng-Feng Huang
(74) *Attorney, Agent, or Firm* — Hewlett Packard Enterprise Patent Department

(57) ABSTRACT

Systems and methods for distributed rule-based correlation of events are provided. A notification of a partial match of a distributed rule by an event of a first subset of events is received. The notification includes a set of properties of the event of the first subset of events. The distributed rule is evaluated using the set of properties of the event of the first subset of events and a set of properties of an event of a second subset of events. A complete match of the rule is determined based on the evaluation, and a correlation event is generated.

19 Claims, 9 Drawing Sheets

(56) References Cited

U.S. PATENT DOCUMENTS

| | | | |
|---|---|---|---|
| 2004/0123141 A1* | 6/2004 | Yadav | 713/201 |
| 2006/0026677 A1 | 2/2006 | Edery et al. | |
| 2009/0254970 A1 | 10/2009 | Agarwal et al. | |
| 2009/0288165 A1* | 11/2009 | Qiu et al. | 726/23 |
| 2009/0299939 A1 | 12/2009 | Jung et al. | |
| 2011/0214157 A1* | 9/2011 | Korsunsky | G06F 21/55 726/1 |

* cited by examiner

SYSTEMS AND METHODS FOR DISTRIBUTED RULE-BASED CORRELATION OF EVENTS

I. BACKGROUND

The field of security information/event management (SIM or SIEM) is generally concerned with 1) collecting data from networks and networked devices that reflects network activity and/or operation of the devices and 2) analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file.

Log data can be generated by various sources, including both networked devices and applications. These sources can be, for example, intrusion detection systems (IDSs), intrusion prevention systems (IPSs), vulnerability assessment tools, firewalls, anti-virus tools, anti-spam tools, encryption tools, application audit logs, and physical security logs. Log data is comprised of data instances called "events." An event can be, for example, an entry in a log file, an entry in a syslog server, an alert, an alarm, a network packet, an email, or a notification page.

In general, an event represents a data structure that includes multiple fields, where each field can contain a value. Security systems, such as SIEM systems, receive events from potentially thousands of sources, many of which are diverse devices. By analyzing the fields, events may be cross-correlated to provide security-related intelligence, such as security breaches. Correlation may include applying rules to events.

II. BRIEF DESCRIPTION OF THE DRAWINGS

The present disclosure may be better understood and its numerous features and advantages made apparent by referencing the accompanying drawings.

III. DETAILED DESCRIPTION

Figure 1:
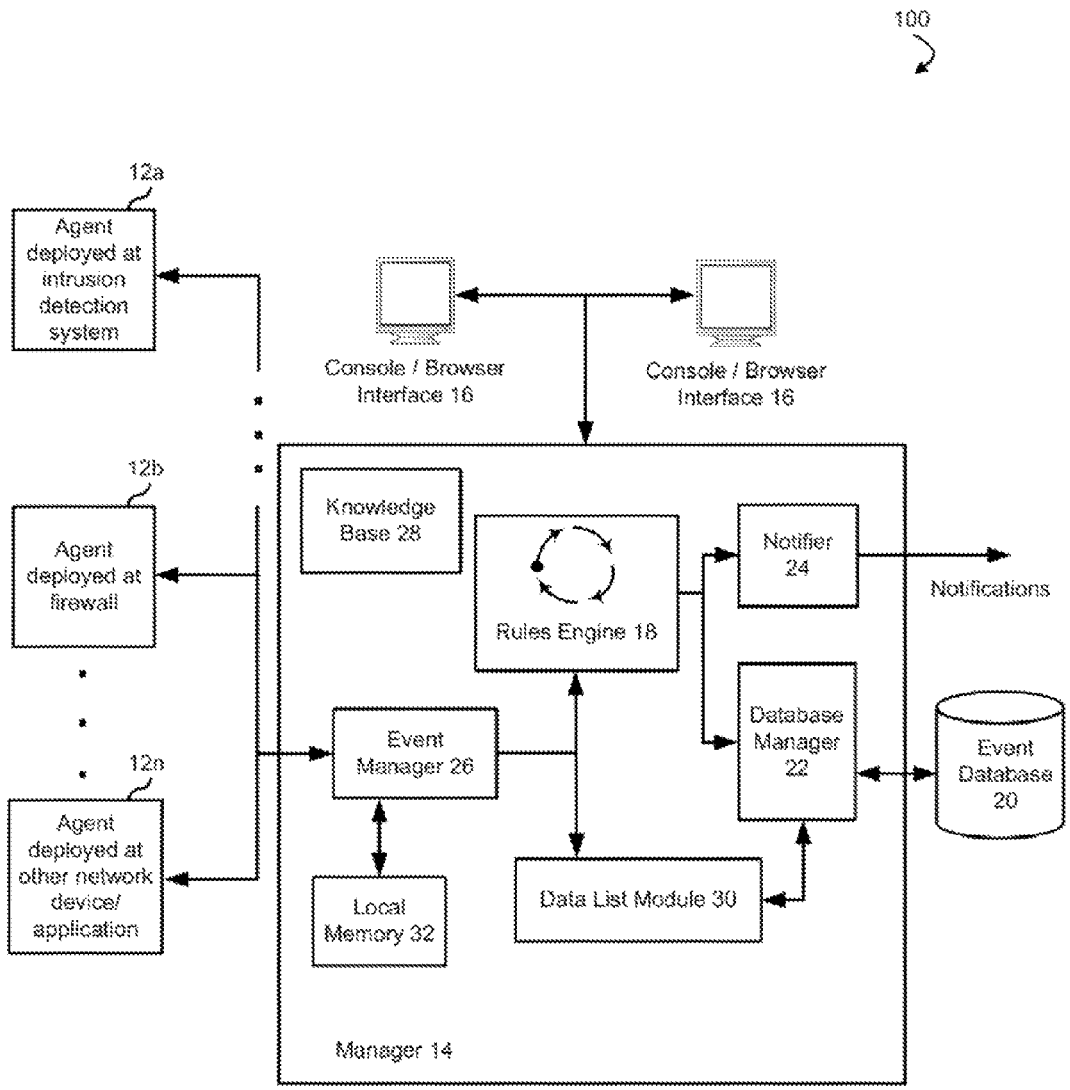
FIG. 1 is a topological block diagram of a network security system in accordance with an embodiment.

Security systems receive events from potentially thousands of sources. Events may be cross-correlated with rules to provide security-related intelligence that would not be identified by individual devices. In general, correlation can indicate that different events from different sources are associated with a common incident, as defined by correlation rules. More specifically, correlation includes, for example, discovering the relationships among events, inferring the significance of those relationships, prioritizing the events and meta-events, and providing a framework for taking action. Correlation is further described in U.S. application Ser. No. 10/308,767, filed Dec. 2, 2002, which is hereby incorporated by reference herein in its entirety.

As used herein, a rule or a "correlation rule" is a procedure and comprises a set of simple or complex conditions which may be combined with other constructs such as aggregation, groupings, and triggers. A rule is used in many ways, such as: to evaluate incoming events for specific conditions and patterns; to correlate information from: different events using rule correlation as well as other constructs like active lists, session lists, and threat level calculations; to infer meaning about significance of events; and to initiate actions in response to events.

In other words, rules express conditions against which event streams are evaluated. The outcome of the evaluation provides information to derive the meaning out of the event streams. When a match is determined, the rule may initiate an action in response.

In addition to conditions, a rule may further include a threshold (i.e., number of occurrences, running total), a time duration, join criterion, and/or an aggregation criterion. For example:

If (failed login attempt) occurs (from the same source IP address) (10 times) within (1 minute) then (Action).

For this rule, the condition is "failed login attempt," the threshold number of occurrences is "10," the time duration is "1 minute," and the aggregation criterion is "from the same source IP address."

Rule conditions may refer to various data models. For example, a rule condition may refer to fields or properties of a network and asset model, which is a representation of nodes and/or machines on a network. The properties may include open ports, operating system, vulnerabilities, business classification, etc.

A rule condition may also refer to a data list, such as an active list and session list. Session lists associate users with their event traffic on the network. More specifically, a session list is a configurable table that maintains temporal data related to user sessions (e.g., DHCP session information, VPN session information, mappings from users to their roles and the corresponding period of time for which those attributes are valid, etc.).

An active list is a configurable table that aggregates specified fields of events. Active lists provide tracking for specific events over a period of time (e.g., days, weeks, etc.). The aggregated data may be made available for correlation. For example, a data list may keep track of a running total of purchases made using a particular credit card for a billing cycle. The running total is referenced by a rule, for example, to alert the credit card holder of reaching a credit limit.

In some large scale installations, a single security manager may be challenged to provide correlation of events. A distributed correlation deployment is scalable for such installations. When each security manager in a distributed deployment receives and processes just a subset of the system-wide events, the correlation is limited to the local knowledge of each individual security manager. As described herein, even if a subset of events is received by a single manager, the correlation is across all events in the network.

Systems and methods for distributed rule-based correlation of events are provided. A notification of a partial match of a distributed rule by an even of a first subset of events is received. The notification includes a set of properties of the event of the first subset of events. The distributed rule is evaluated using the set of properties of the event of the first subset of events and a set of properties of an event of a second subset of events. A complete match of the rule is determined based on the evaluation, and a correlation event is generated. Distributed correlation may occur in either real-time or in batch mode.

FIG. 1 is a topological block diagram of a network security system 100 in accordance with an embodiment. System 100 includes agents 12a-n, at least one manager 14 and at least one console 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system rows.

Agents 12a-n are software programs, which are machine readable instructions, that provide efficient, real-time (or near real-time) local event data capture and filtering from a variety of network security devices and/or applications. The typical sources of security events are common network security devices, such as firewalls, intrusion detection systems and operating system logs. Agents 12a-n can collect events from any source that produces event logs or messages and can operate at the native device, at consolidation points within the network, and/or through simple network management protocol (SNMP) traps.

Agents 12a-n are configurable through both manual and automated processes and via associated configuration files. Each agent 12 may include at least one software module including a normalizing component, a time correction component, an aggregation component, a batching component, a resolver component, a transport component, and/or additional components. These components may be activated and/or deactivated through appropriate commands in the configuration file.

Manager 14 may be comprised of server-based components that further consolidate, filter and cross-correlate events received from the agents, employing a rules engine 18 and a centralized event database 20. One role of manager 14 is to capture and store all of the real-time and historic event data which it receives to construct (via database manager 22) a picture of security activity. The manager 14 also provides centralized administration, notification (through at least one notifier 24), and reporting, as well as a knowledge base 28 and case management workflow. The manager 14 may be deployed on any computer hardware platform and one embodiment uses a database management system to implement the event data store component. Communications between manager 14 and agents 12a-n may be bi-directional (e.g., to allow manager 14 to transmit commands to the platform hosting agents 12a-n) and encrypted. In some installations, managers 14 may act as concentrators for multiple agents 12a-n and can forward information to other managers (e.g., deployed at a corporate headquarters).

Manager 14 also includes at least one event manager 26, which is responsible for receiving the event data messages transmitted by agents 12a-n and/or other managers, and receiving event summary data from other managers. Event manager 26 is also responsible for generating event data messages such as correlation events and audit events. Where bi-directional communication with agents 12a-n is implemented, event manager 26 may be used to transmit messages to agents 12a-n. If encryption is employed for agent-manager communications, event manager 26 is responsible for decrypting the messages received from agents 12a-n and encrypting any messages transmitted to agents 12a-n.

Once the event data messages and/or event summary data have been received, the event, data is passed to the rules engine 18. Rules engine 18 is configured to cross-correlate the event data and/or event summary data with correlation rules in order to identify partial rule matches and/or complete rule matches.

The actions triggered by the rules may include notifications transmitted (e.g., via notifier 24) to designated destinations (e.g. security analysts may be notified via the consoles 16, email messages, a call to a telephone, cellular telephone, voicemail box and/or pager number or address, or by way of a message to another communication device and/or address such as a facsimile machine, etc.) and/or instructions to network devices (e.g., via agents 12, etc.).

Consoles 16 are computer- (e.g., workstation-) based applications that allow security professionals to perform day-to-day administrative and operation tasks such as event monitoring, rules authoring, incident investigation and reporting. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture, a centralized or decentralized environment may be supported. This is useful because an organization may want to implement a single instance of system 100 and use an access control list to partition users. Alternatively, the organization may choose to deploy separate systems 100 for each of a number of groups and consolidate the results at a "master" level. Such a deployment can also achieve a "follow-the-sun" arrangement where geographically dispersed peer groups collaborate with each other bypassing oversight responsibility to the group currently working standard business hours. Systems 100 can also be deployed in a corporate hierarchy where business divisions work separately and support a roll-up to a centralized management function.

In a distributed deployment, multiple managers, such as manager 14, may be installed in network security system 100. However, each individual manager has access to those events that are sent to it. As described herein, the managers are aware of each other's presence using a centralized registry. If a rule is shared by multiple managers and marked as a distributed rule, one of the managers is elected as the "master" manager for the rule and the others are designated as "slaves." Any one manager may be both a master and slave. For any one distributed rule, there is a single master and the remaining managers are slaves. In one embodiment, each manager of the multiple managers in network security system 100 is a master of a subset of the distributed rules.

Manager 14 is configured to act in the capacity of a slave manager with respect to a particular rule in the set of all distributed rules. In this capacity, manager 14 operates on events which it receives and does not have information on the events received by other managers. As such, correlation performed by manager 14 is based on a partial set of events. In particular, manager 14 is configured to receive a subset of events, determine whether each event in the subset is at least a partial match with a rule for which it acts in a slave capacity, generate event summary data of the partial match, and transmit the event summary data to a master manager.

As used herein, an event summary includes properties about an event that is at least a partial match with a rule. An event summary includes properties such as a set of aggregation fields, a set of join fields, event identifiers, and/or a time of occurrence of the event (i.e., event timestamp).

Manager 14 is also configured to act in the capacity of a master manager with respect to a particular rule in the set of all rules. In this capacity, manager 14 operates on events which it receives and also has knowledge of the events received by other managers to the extent that those events are at least partial matches to the particular rule for which manager 14 is a master. In particular, manager 14 is configured to receive a subset of events, determine whether each event in the subset is at least a partial match with a rule for which it acts in a master capacity, receive event summary data of partial matches from other managers (acting in the slave capacity with respect to the particular rule), determine whether there is a complete match with the particular rule for which manager 14 acts in the manager capacity, generate a correlation event, and perform actions according to the particular rule.

As such, one role of manager 14 is to capture and store all of the real-time and historic event data and/or event summary to construct (via database manager 22) a complete, enterprise-wide picture of security activity with respect to the particular rule for which manager 14 is a master, in one embodiment, the partial match events are provided to the master manager in addition to the event summary data.

Since each distributed rule is associated with a master manager, and each master manager provides a complete picture of security activity with respect to that rule, the group of managers acting in a master capacity provides a complete, enterprise-wide picture of security activity for all distributed rules over network security system 100. As such, even if a subset of events is received by a single manager, the correlation is across all events in the network.

The network security system 100 also includes data list capabilities, in one embodiment, manager 14 further includes a data list module 30 and a local memory 32. Data list module 30 is configured to maintain session lists and/or active lists. Furthermore, data list module 30 is configured to receive a set of events, such as security events from at least one of agents 12a-n via event manager 26 or from the event manager 26 itself, and/or receive event summary data from at least one of agents 12a-n via event manager 26. The session lists and/or active lists may be maintained in tables (i.e., master table and/or local tables) in local memory 32. Local memory 32 may be any appropriate storage medium and may be located on manager 14 itself, in a cluster containing manager 14, or on a network node accessible to manager 14. A master table is maintained for session lists and/or active lists associated with the particular rule for which manager 14 is a master. A local table is maintained for session lists and/or active lists associated with the particular rule for which manager 14 is a slave.

Data list module 30 is further configured to process the events and/or event summary data, for example by extracting session information and/or aggregating specified fields of events. Data list module 30 is also configured to synchronize local tables of other managers in the distributed deployment with the master tables, and to batch look-up requests in local tables until data in a local table is validated.

In operation, agents 12a-n provide events, which are received in an event stream by event manager 26 and passed to rules engine 18 for processing. Furthermore, events generated by manager 14 via event manager 26 are also passed to rules engine 18 for processing. As used herein, an event stream is a continuous flow of events. Event data received from agents 12a-n or generated by manager 14 are stored in an event table of database 20 via database manager 22.

In another example, other managers provide event summary data to manager 14, which are received in a stream by event manager 26 and passed to rules engine 18 for processing.

Upon receiving an event and/or an event summary data, rules engine 18 cross-correlates with rules in a slave capacity and/or a master capacity, and data list module 30 maintains session lists and/or active lists.

Figure 2A:
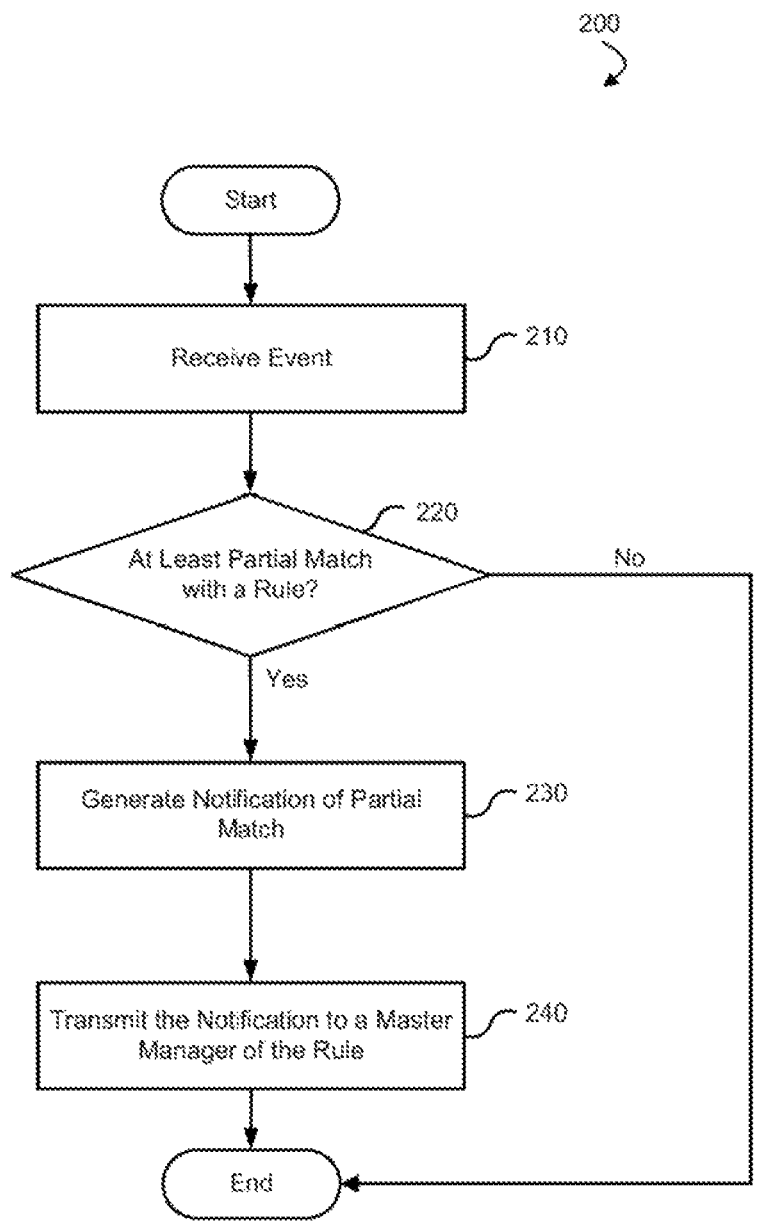
FIG. 2A is a process flow diagram for correlation by partial rule matching in accordance with an embodiment.

FIG. 2A is a process flow diagram for correlation by partial rule matching in accordance with an embodiment. The depicted process flow 200 may be carried out by execution of sequences of executable instructions. In another embodiment, various portions of the process flow 200 are carried out by components of a network security system, an arrangement of hardware logic, e.g., an Application-Specific Integrated Circuit (ASIC), etc. For example, blocks of process flow 200 may be performed by execution of sequences of executable instructions in a rules engine of the network security system. The rules engine may be deployed, for example, at a manager in the network security system.

In a distributed deployment, multiple managers may be installed in the network security system. A single manager in the distributed deployment is assigned as an owner or master for each distributed rule. Other managers in the distributed deployment operate in the capacity of a slave with respect to that rule. Process flow 200 may be carried out a manager acting in the slave capacity.

At step 210, an event is received, for example, in an event stream from sources feeding the manager. As previously mentioned, each manager in a distributed deployment receives a subset of events. As such, the event is a part of a subset of events among the entire set of events in the distributed deployment.

The manager correlates the events that it receives (i.e., subset of events) with the distributed rules (or a subset of the distributed rules). In particular, at step 220, it is determined whether the event at least partially matches with a distributed rule. If there is a partial match, the event could potentially produce a complete match. As previously discussed, a rule includes a set of conditions. An event is evaluated against all sets of conditions for a rule, however, to produce a partial match, the event matches at least one set of those conditions.

The rule may be a simple rule, which contains one set of conditions. Therefore an event that matches the single set of conditions is a complete match for the rule. For example, a simple rule may include a set of conditions, where the set includes two conditions. The first condition requires the event to target a particular type of asset, and a second condition which requires the event to be categorized as hostile. In the case of a simple rule, a partial (and complete) match is determined where the received event matches the set of conditions, i.e., both conditions in this example.

The rule may be a join rule, which are triggered by events that match two or more sets of conditions. A join rule is used to connect events from different network nodes in order to understand attributes that are in common. Join rules recognize patterns that involve more than one type of event. For example, a join rule may include a first set of conditions that require an event to be from an intrusion detection system (IDS), directed to asset 1, on port 1. A second set of conditions specify a permit event, from a firewall, also directed to asset 1, on port 1. Where the received event matches at least one of these set of conditions, a partial match is determined.

The event may also be evaluated against all sets of conditions for all distributed rules.

Where at least a partial match is not determined, processing ends, until the next event is received. Otherwise, a notification of the partial match of the rule is generated at step 230. The notification includes event summary data. As previously described, an event summary includes properties about an event that is determined to be at least a partial match with a rule. An event summary is a synopsis about the event. For example, the event summary is a data structure that includes properties such as an event identifier and certain fields of the event, such as a time of occurrence of the event (i.e., event timestamp), and values of the join and/or aggregation fields. Where a join rule seeks an IDS event and a firewall event, the join fields may include a source address, target address, and a target port. An event identifier may be a global unique identifier, which is an event identifier assigned by the manager that receives the event and is unique across the distributed deployment. A notification is generated for each rule and event for which a partial match is determined. In one embodiment, notifications may be aggregated to reduce the volume of data transmitted to the master manager.

At step 240, the notification is transmitted to a master manager of the rule. The master manager uses the notification to correlate across all events in the distributed environment against the rule for which it is a master. In one embodiment, notifications are transmitted on a periodic bases, for example, every five seconds.

Figure 2B:
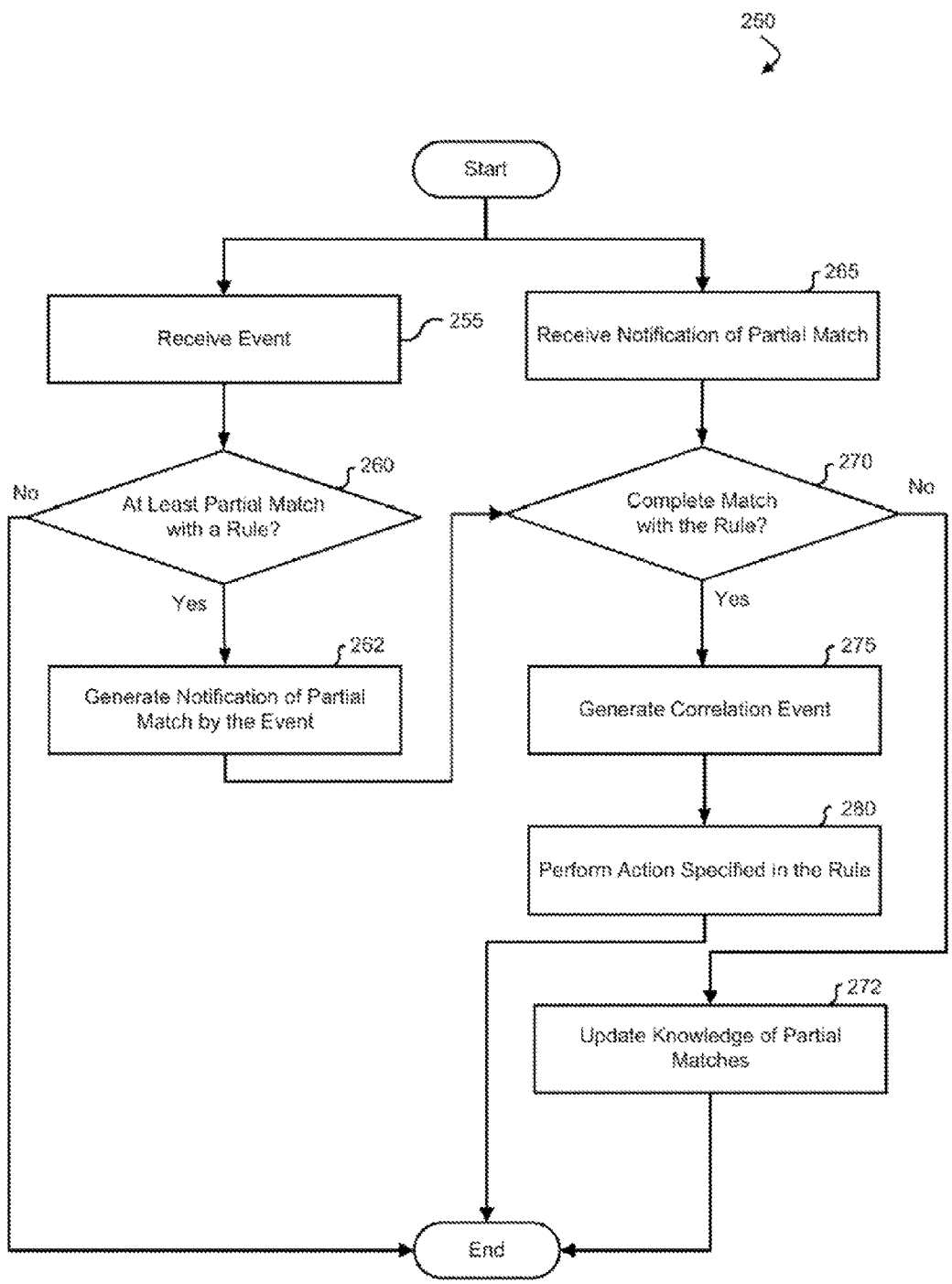
FIG. 2B is a process flow diagram for correlation by complete rule matching in accordance with an embodiment.

FIG. 2B is a process flow diagram for correlation by complete rule matching in accordance with an embodiment. The depicted process flow 250 may be carried out by execution of sequences of executable instructions. In another embodiment, various portions of the process flow 250 are carried out by components of a network security system, an arrangement of hardware logic, e.g., an Application-Specific Integrated Circuit (ASIC), etc. For example, blocks of process flow 250 may be performed by execution of sequences of executable instructions in a rules engine of the network security system. The rules engine may be deployed, for example, at a manager in the network security system.

In a distributed deployment, multiple managers may be installed in the network security system. A single manager in the distributed deployment is assigned as an owner or master for each distributed rule. Other managers in the distributed deployment operate in the capacity of a slave with respect to that rule. Process flow 200 may be carried out a manager acting in the master capacity.

A master manager may receive both events and notifications of partial matches. The notifications indicate partial matches by events received by other managers in the distributed deployment. Steps 255-262 are similar to steps 210-230 of FIG. 2A, except that steps 255-262 are performed by a manager when evaluating events against a rule for which it is a master. At step 255, an event is received, for example in an event stream from sources feeding the manager. It is determined whether the event at least partially matches with the rule for which the manager is a master, at step 260. Where at least a partial match is determined, a notification of the partial match with the rule is generated, at step 262. The notification is used to determine a complete match with the rule at step 270.

In one embodiment, after determining a partial match at step 260, processing may proceed directly to step 270, where the master manager evaluates whether there is a complete match. In other words, step 262 may be bypassed.

In one configuration, the master manager is a manager dedicated to evaluating complete matches. The dedicated manager may receive partial match notifications from other managers, but may not receive events for example from its own sources. In this scenario, the dedicated master manager may not perform steps 255-262, which involve evaluation of events. A dedicated manager configuration is further described with respect to FIG. 4B.

At step 265, a notification of a partial match is received, for example from a slave manager in the distributed correlation deployment. It is determined whether there is a complete match with the rule for which the manager is master, at step 270. Various partial match notifications are considered to determine a complete match. For example, notifications of partial match of events received by the master manager and by other managers are used. The event summary data from the partial match notifications are aggregated. If the aggregate exceeds the threshold (e.g., number of occurrences, running totals) defined by the rule, a complete match is determined and the rule is triggered. In one embodiment, in addition to partial match notifications received from other managers, a determination of at least a partial match based on events the master manager receives (i.e., from step 260) may be used to compute the complete match.

In one embodiment, both simple and join rules may specify that events be aggregated over a certain time duration. If a simple rule is configured to aggregate multiple events with matching attributes, a complete match is determined when the specified number of matching events occur. For example, if the rule is configured to aggregate three matching events, the rule is triggered when those three matching events occur in the time limit specified.

If a join rule is configured for aggregation, a complete match is determined if the specified number of matching events occurs within the specified time duration. Determination of a complete match is further described with respect to FIG. 3.

A correlation event is generated at step 275 where a complete match is determined. The correlation event includes information about the base events that triggered the rule in addition to rule-specific information. In one embodiment, the correlation event may be used for condition-matching thus allowing chaining of multiple events.

At step 280, an action specified in the rule is performed. Actions may include executing a pre-determined command or script, updating a data list, logging an alert, sending alerts to a console or notification designees, setting custom severity levels for the alert based on cumulative activity, adding a source to a list of suspicious sources, adding a target to a vulnerability list, or any combination of these actions. As such, even if a subset of events is received by a single manager, correlation may be performed across all events in the distributed deployment.

Where the outcome of step 270 is that a complete match has not been determined, knowledge of the partial matches received thus far is updated at step 272. Specifically, counts, timestamps, rule identifiers are maintained about prior partial matches, which is used for matching with future partial matches. For example, when another notification of a partial match is received at step 265, the determination of a complete match at step 270 is based on the newly received notification and knowledge of the prior partial matches.

Figure 3:
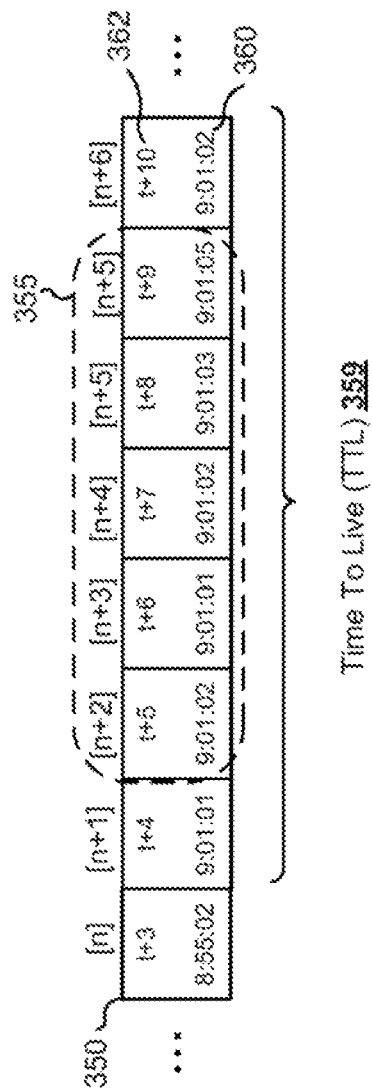
FIG. 3 is a block diagram of a sliding aggregation window in accordance with an embodiment.

FIG. 3 is a block diagram of a sliding aggregation window in accordance with an embodiment. Security events are time and count sensitive. For example, if a security system receives multiple Secure File Transfer Protocol (SSH) login failures within a second, there is a chance the system is under an SSH brute force attack. On the other hand, if the multiple failures are temporally disbursed, for example over minutes or hours, the failures may be harmless from a security perspective. As such, many correlation rules specify a time duration and a threshold (i.e., number of occurrences, running total).

For example, a rule may trigger an alert if;
(a failed login attempt) occurs (from the same source IP address) (10 times) within (1 minute).
In this example, the time duration is "1 minute" and the threshold is "10 times."

The process of aggregation may include grouping together events with similar properties, as specified by a rule s aggregation criteria. The similar events may be fed into a buffer, such as a timeline buffer 350.

As events and/or partial match notifications (which include event summaries) are received by a master manager, events or event summary data are grouped by the same source IP address, in this example, ordered by the time of occurrence of the event, and fed into timeline buffer 350.

The timeline buffer 350 may be a First In First Out (FIFO) buffer of unlimited size. Each element of timeline buffer 350 represents an event and includes data (i.e., properties) about the event, such as the time of occurrence of the event and time of receipt of the event by the master manager. For example, element "[n+6]" of timeline buffer 350 includes a time of occurrence property 362 and a time of receipt property 360.

For complete rule matching to occur, a master manager aggregates events over a time window, such as sliding window 355. The duration at which a sliding window aggregates may be determined by the duration as specified in a distributed rule. If any sliding time window can produce the threshold number of matches, a complete match is determined for the rule.

Continuing with the previous example, aggregation is performed on the properties of the events that are within window 355, for example by counting the number of occurrences of failed login attempts by a source IP address such as 172.16.254.1. The duration of window 355 is set to one minute, as specified in the rule. If the count exceeds ten, the rule is triggered and an alert is generated.

The window 355 is a sliding window, which can recognize rule completion over a time duration, regardless of the initial starting time of the aggregation. One benefit of implementing a sliding window is to prevent attackers from timing an attack on the time boundaries (e.g., explicit start time, explicit end time) of the window, and thus escaping detection.

In a distributed system, there may be delays with which notifications and events are received, for example by a master manager. This may cause the notifications and events to be received in an out-of-order manner. Recognizing that delays are a possibility, events may be dropped out of timeline buffer 350 at a later time. In other words, the time to live for an event is extended for a longer period of time than when in the context of a single deployment. As shown, elements "[n+1]" through "[n+6]" of buffer 350 are within a time to live 359, however, element "[n]" is not and as such is dropped.

In one embodiment, a time to live for an event in a timeline buffer (before being dropped) is determined by extending the time to live by the expected delay of receiving events and/or notifications from other managers in the distributed deployment.

Figure 4A:
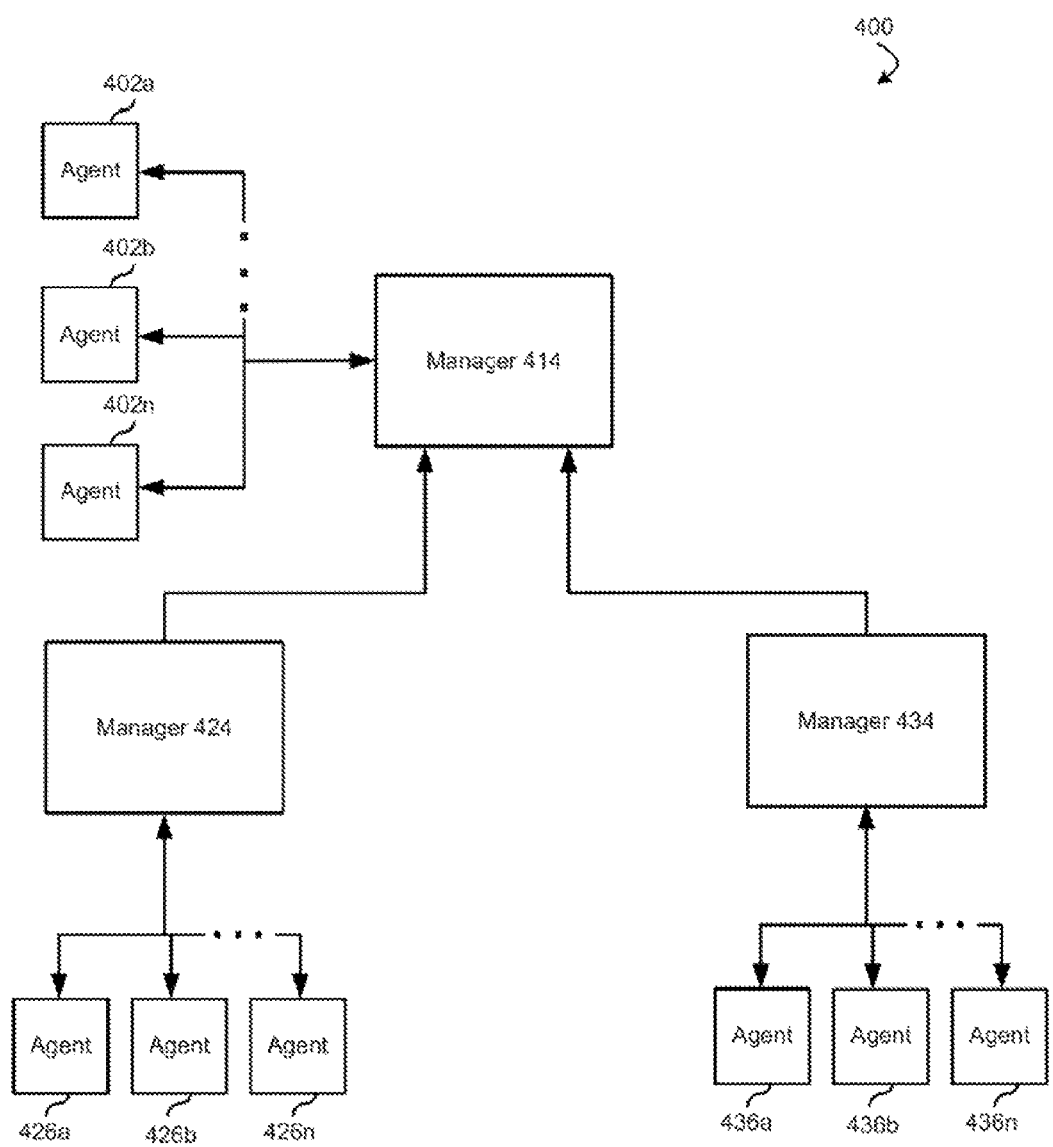
FIG. 4A is a topological block diagram of a network security system including a master manager of a plurality of managers in accordance with an embodiment.
Figure 4B:
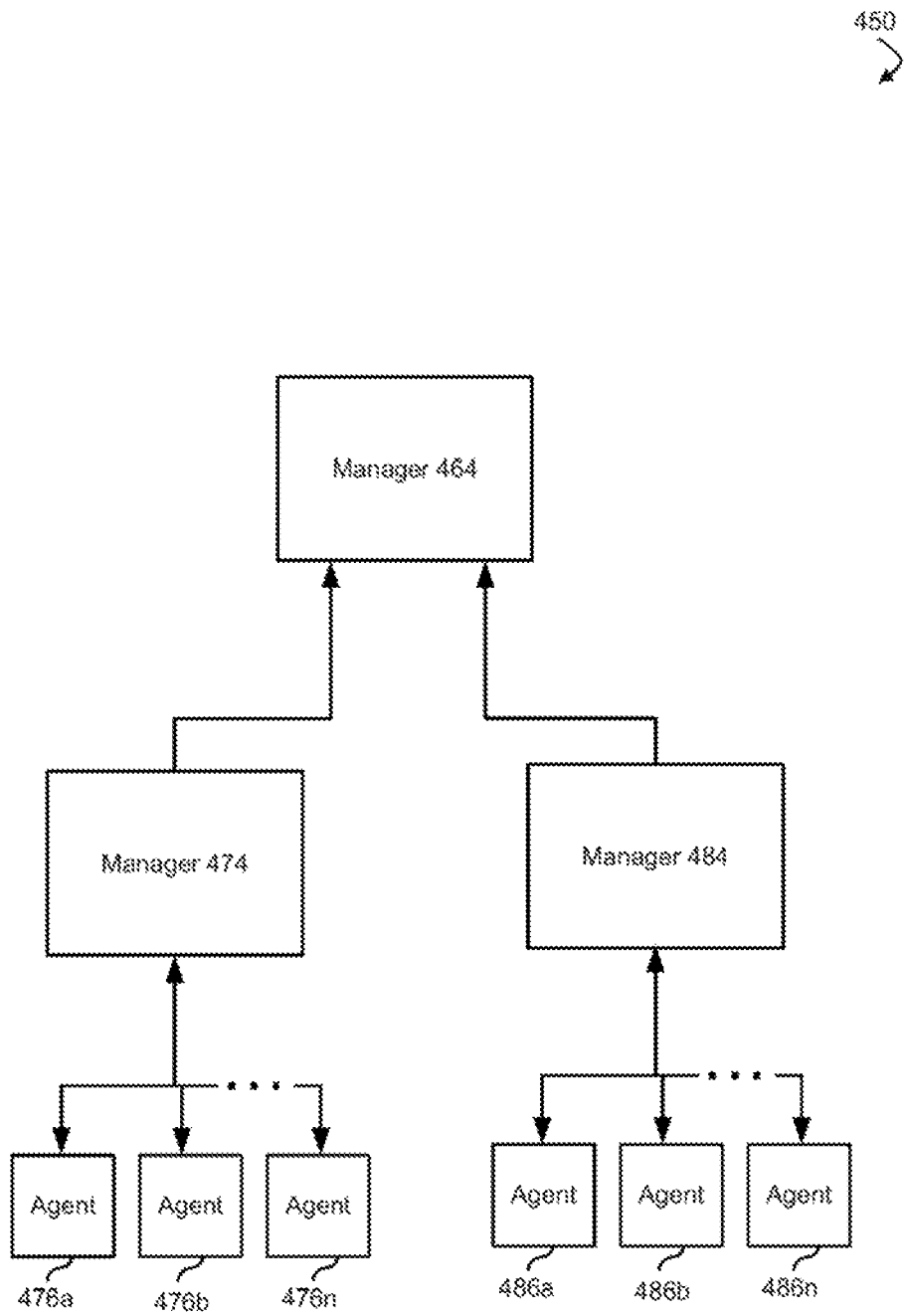
FIG. 4B is a topological block diagram of a network security system including a dedicated manager of a plurality of managers in accordance with an embodiment.

FIG. 4A is a topological block diagram of a network security system including a master manager of a plurality of managers in accordance with an embodiment. System 400 includes agents 402a-n, 426a-n, agents 436a-n, a manager 414, a manager 424, and a manager 434. As shown, agents 402a-n, 426a-n, agents 436a-n, and/or managers 414-434 are distributed in multiple platforms. Such distributed computing deployments provide load-balancing among the managers of system 400. Any one of managers 414-434 is configured to act as a master manager of a distributed rule and as a slave manager of another distributed rule.

In one example, manager 414 is a master for a first rule. Manager 424 and manager 434 operate as slave managers for the first rule. Manager 414 receives events from agents 402a-n, whereas manager 424 receives events from agents 426a-n and manager 434 receives events from agents 436a-n. As such, each of managers 414-434 receive a subset of events of all events in the distributed deployment.

In order to correlate across all the events, a slave manager determines if the events it receives qualify as a partial match for a rule. In this example, manager 424, which operates as a slave manager for the first rule, determines if any events it receives (from agents 426a-n) are partial matches for the first rule. Likewise, manager 434, which also operates as a slave manager for the first rule, determines if any events it receives (from agents 436a-n) are partial matches for the first rule. Where there is a partial match, manager 424 and manager 434 notify manager 414, which operates as the master for the first rule. Manager 414 determines whether there is a complete match for the first rule, based on the notifications from managers 424 and 434 and based on any partial matches of events received from agents 402a-n.

As such, even if a subset of events is received by master manager 414, the correlation with respect to the first rule is across all the events in system 400.

FIG. 4 is a topological block diagram of a network security system including a dedicated manager of a plurality of managers in accordance with an embodiment. System 450 includes agents 476a-n and agents 486a-n, a manager 464, a manager 474, and a manager 484. As shown, agents 476a-n and agents 486a-n, and/or managers 464-484 are distributed in multiple platforms.

System 450 is similar to system 400 of FIG. 4A except that a manager (i.e., manager 464) is configured to act as a dedicated master. As used herein, a dedicated master is responsible for computing aggregates and complete matches for at least one distributed rule, or even for all distributed rules. A dedicated master may not compute partial matches, for example if it does not receive events from its own sources. As shown, manager 464 is not connected to any of its own agents. A distributed deployment may include multiple dedicated managers.

In one embodiment, manager 464 is a dedicated master for at least one distributed rule. Each of manager 474 and manager 484 is configured to act as a slave for the distributed rule. Manager 474 and manager 484 report partial matches to manager 464, which then determines whether there is a complete match based on the received notifications. Accordingly, manager 464 correlates across all the events in system 400 for the rule.

Figure 5A:
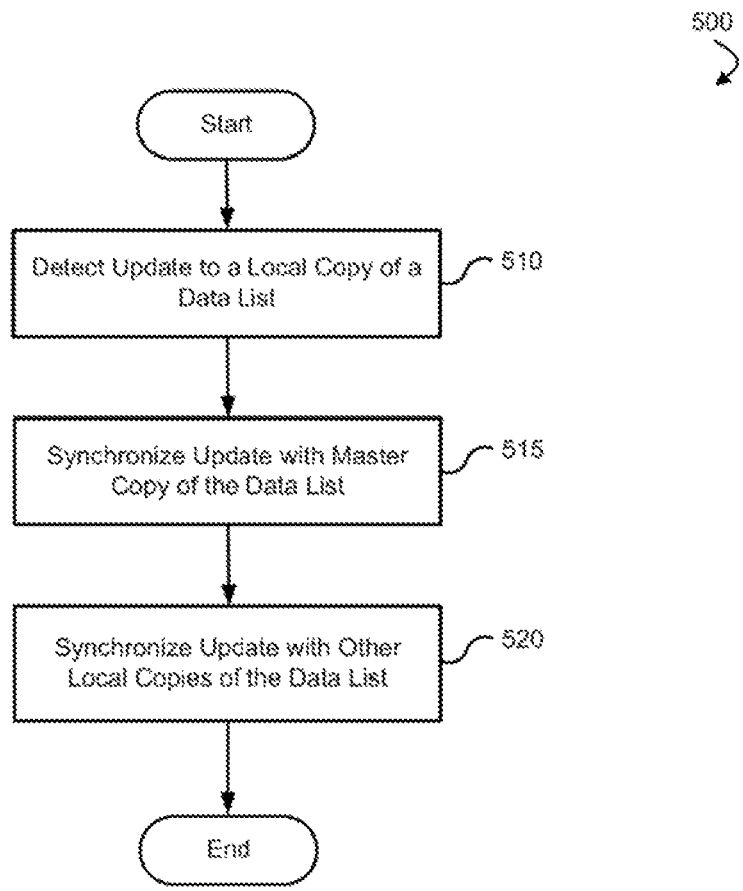
FIG. 5A is a process flow diagram for data list synchronization in accordance with an embodiment.

FIG. 5A is a process flow diagram for data list synchronization in accordance with an embodiment. The depicted process flow 500 may be carried out by execution of sequences of executable instructions. In another embodiment, various portions of the process flow 500 are carried out by components of a network security system, an arrangement of hardware logic, e.g., an Application-Specific Integrated Circuit (ASIC), etc. For example, blocks of process flow 500 may be performed by execution of sequences of executable instructions in a data list module of the network security system. The data list module may be deployed, for example, at a manager in the network security system.

Rules can read from and provide updates to data lists, such as active lists and session lists. To maintain coherency among these lists in a distributed deployment of the network security system, the master and slave model may be implemented. One manager is designated to hold a master copy of a particular data list. All other managers in the distributed deployment maintain a local copy of that particular data list.

Updates to the particular data list are synchronized among all copies (i.e., master and local) in the distributed system. At step 510, an update to a local copy of a data list is detected, for example by a manager holding the master copy of the data list. In one embodiment, managers holding local copies of the list transmit information of the changes made (delta update) to the data list, rather than the data list in its entirety.

At step 515, the update is synchronized with the master copy of the data list. More specifically, the update is merged with the master copy. The update is also synchronized with other local copies of the data list, at step 520. For example, the master manager notifies the other managers holding local copies of the data list to synchronize. In another embodiment, the synchronization occurs periodically.

A delay between synchronizations of the data lists may be user-configurable or may be managed by the network security system, for example based on load and demand. In general, the time interval of updates is expected to be a few seconds or less.

Figure 5B:
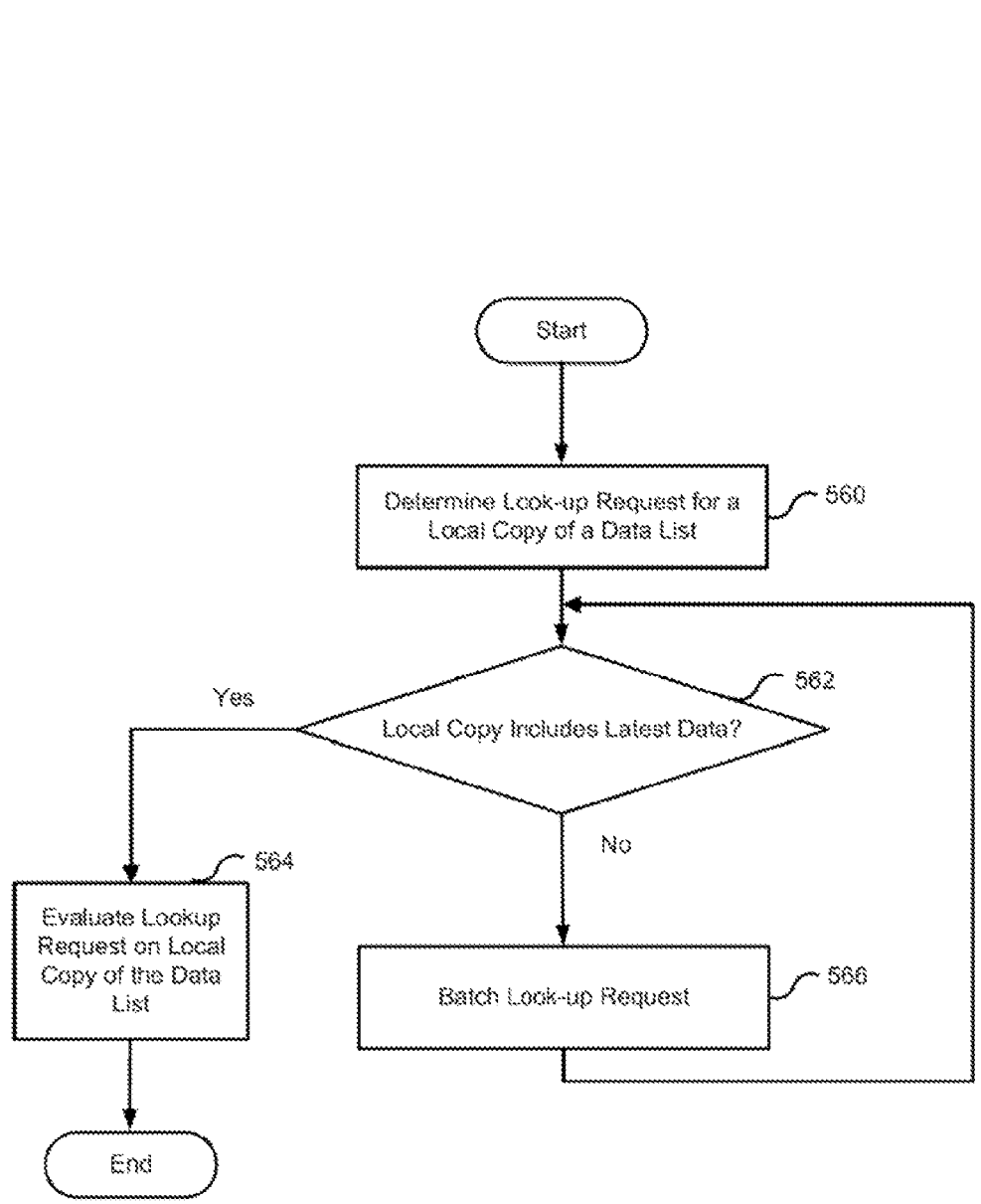
FIG. 5B is a process flow diagram for data list access in accordance with an embodiment.

FIG. 5B is a process flow diagram for data list access in accordance with an embodiment. The depicted process flow 550 may be carried out by execution of sequences of executable instructions. In another embodiment, various portions of the process flow 550 are carried out by components of a network security system, an arrangement of hardware logic, e.g., an Application-Specific Integrated Circuit (ASIC), etc. For example, blocks of process flow 550 may be performed by execution of sequences of executable instructions in a data list module of the network security system. The data list module may be deployed, for example, at a manager in the network security system.

As previously described, rules can read from and provide updates to data lists, such as active lists and session lists. To maintain coherency among these lists in a distributed deployment of the network security system, the master and slave model may be implemented. One manager is designated to hold a master copy of a particular data list. All other managers in the distributed deployment maintain a local copy of that particular data list.

A manager may read from a data list when evaluating a rule that includes a threshold involving running totals. For example, the following rule is triggered when a running total of dollars spent on a credit card is 75% or more of a credit limit:

If (dollars spent) by (User A) is (75% of $1500 credit limit) within (1 month) then (send alert to User A).

The preceding rule is comprised of: a running total threshold (i.e., "dollars spent"); an aggregation criteria (i.e., "User A"); a condition (i.e., "75% of $1500 credit limit"); and a time duration (i.e., "1 month"). The running total may be maintained in an active list. Where there are multiple copies of a data list in the distributed system, data validation is performed on a local copy before the lookup operations are evaluated.

At step 560, a lookup request for a local copy of a data list is determined. At step 562, it is determined whether the local copy of the data list includes the latest data, in particular, it is determined whether the data that is being accessed in the data list is the latest, based on a time of occurrence of an event. The most recent time at which the manager was synchronized with a master is determined. Up to this point, the manager is known to be current.

An event may be received by the manager. The evaluation of the event triggered the lookup request in the local data list. Where the time of occurrence of the event is before (i.e., earlier than) the time of the most recent synchronization, it is determined that the local copy includes the latest data, and the lookup request is evaluated on the local copy of the data list, at step 564.

In another embodiment, where the local copy is synched with the master copy, the data is determined to be validated and the lookup request is evaluated on the local copy.

Otherwise, the lookup request is batched, at step 566. The look-up request continues to be batched until it is determined that the data in the local copy is validated, i.e., the local copy includes the latest data, at step 562.

Figure 6:
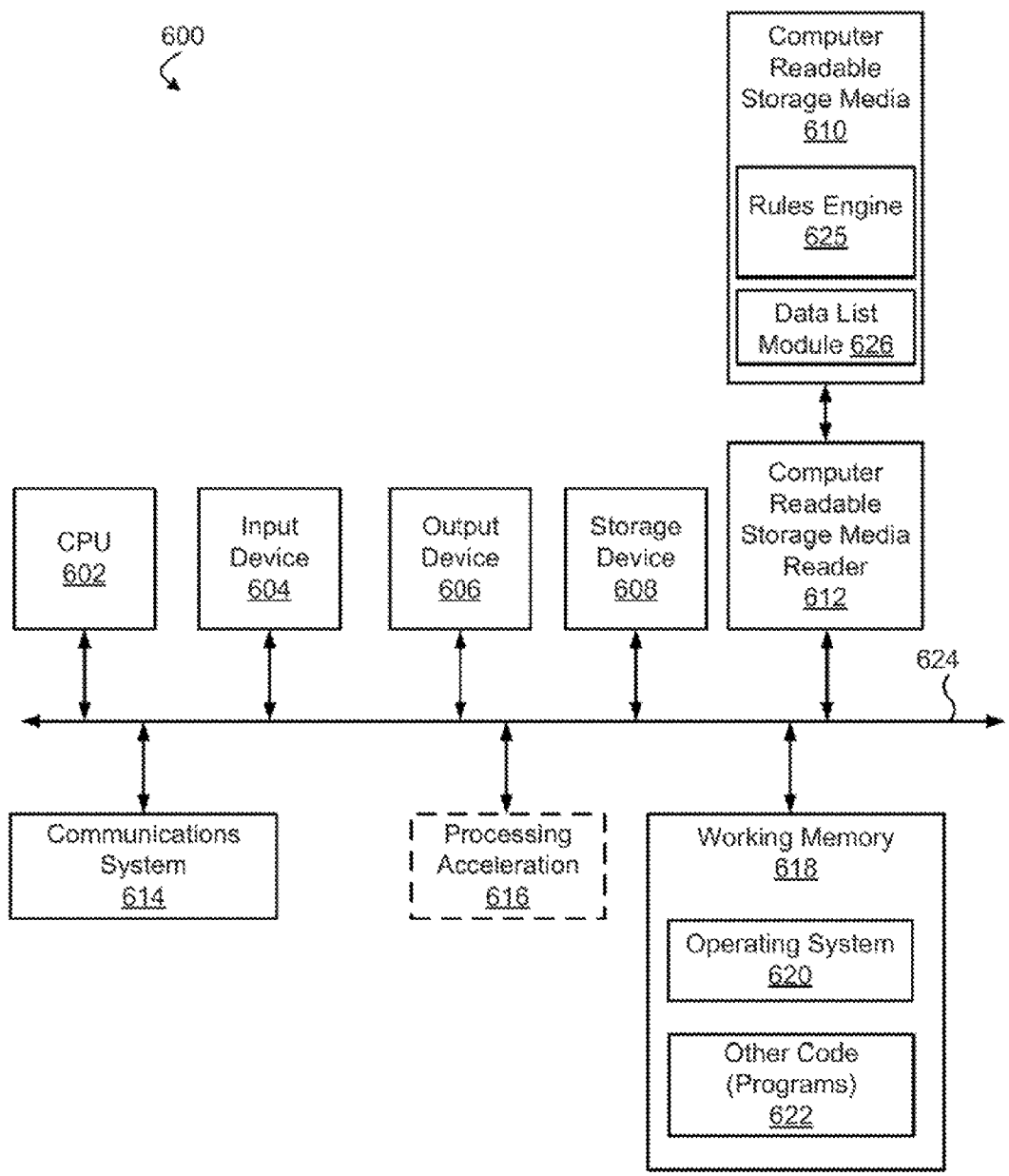
FIG. 6 illustrates a computer system in which an embodiment may be implemented.

FIG. 6 illustrates a computer system in which an embodiment may be implemented. The system 600 may be used to implement any of the computer systems described above. The computer system 600 is shown comprising hardware elements that may be electrically coupled via a bus 624. The hardware elements may include at least one central processing unit (CPU) 602, at least one input device 604, and at least one output device 606. The computer system 600 may also include at least one storage device 608. By way of example, the storage device 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor (DSP), a special-purpose processor, and/or the like.

The computer-readable storage media reader 612 can further be connected to a computer-readable storage medium 610, together (and in combination with storage device 608 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 610 may be non-transitory such as hardware storage devices (e.g., RAM, ROM, EPROM (erasable programmable ROM), EEPROM (electrically erasable programmable ROM), hard drives, and flash memory). The communications system 614 may permit data to be exchanged with the network and/or any other computer described above with respect to the system 600. Computer-readable storage medium 610 includes a rules engine 625, and a data list module 626.

The computer system 600 may also comprise software elements, which are machine readable instructions, shown as being currently located within a working memory 618, including an operating system 620 and/or other code 622, such as an application program (which may be a client application, Web browser, mid-tier application, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for distributed correlation of events implemented by a physical processor of a master management device deployed on a computer hardware program platform executing computer-readable instructions, the method comprising:
   determining, by the processor, a first event of a first subset of events is a first partial match of a distributed rule from a first slave management device, wherein the distributed rule is associated with the master management device;
   determining, by the processor, a second event of a second subset of events is a second partial match of the distributed rule from a second slave management device;
   receiving, by the processor, event summary data comprising properties of events determined to be partial matches of the distributed rule from the first and the second slave management devices;
   receiving, at the processor, a first notification of the first partial match by the first event and a second notification of the second partial match by the second event, wherein the first notification comprises a set of properties of the first event, and the second notification comprises a set of properties of the second event;
   aggregating, by the processor, the first notification and the second notification;
   evaluating, by the processor, the distributed rule by aggregating, over a sliding time window, the set of properties of the first event and the set of properties of the second event;
   determining, by the processor, based on the event summary data, and in response to the aggregation of the set of properties of the first event and the set of properties of the second event exceeding a threshold defined by the distributed rule, a complete match of the distributed rule based on the evaluation; and
   generating, by the processor, a correlation event.

2. The method of claim 1, further comprising:
   receiving, at the processor, the second event;
   evaluating, by the processor, the distributed rule using the set of properties of the second event; and
   determining, by the processor, the second partial match of the distributed rule by the second event.

3. The method of claim 1, wherein the first event is received at a second computing device, and wherein the notification of the first partial match by the first event is generated by the second computing device.

4. The method of claim 1, wherein the set of properties of the first event of the first subset of events includes an event timestamp, an event identifier, a set of aggregation fields, or a set of join fields.

5. The method of claim 1, wherein evaluating the distributed rule comprises:
   determining, by the processor, whether each set of conditions of the distributed rule is satisfied based on the aggregation of the set of properties of the first event and the set of properties of the second event.

6. The method of claim 1, further comprising:
   detecting, by the processor, an update to a local copy of a data list; and
   synchronizing, by the processor, a master copy of the data list with the local copy.

7. The method of claim 1, wherein data validation is performed on a local copy of a data list prior to evaluating a lookup request on the local copy.

8. The method of claim 7, wherein the lookup request is batched until the local copy of the data list is validated.

9. The method of claim 1, further comprising performing an action, by the processor, specified in the distributed rule based on the correlation event.

10. The method of claim 9, wherein performing the action, by the processor, comprises executing a pre-determined command or script, updating a data list, logging an alert, sending alerts to a console or notification designees, setting custom severity levels for the alert based on cumulative activity, adding a source to a list of suspicious sources, adding a target to a vulnerability list, or a combination thereof.

11. The method of claim 1, further comprising each of the first and the second slave management devices operating on a plurality of events which it receives, wherein each of the first and the second slave management devices does not have information on a plurality of events received by other slave management devices.

12. A system for distributed correlation of events, the system comprising:
    non-transitory memory; and
    a first hardware processor of a master management device deployed on a computer hardware platform of a first computer system, in communication with the memory, and configured to:
       determine a first event of a first subset of events is a first partial match of a distributed rule from a first slave management device, wherein the distributed rule is associated with the master management device;

determine a second event of a second subset of events is a second partial match of the distributed rule from a second slave management device;

receive event summary data comprising properties of events determined to be partial matches of the distributed rule from the first and the second slave management devices; and generate a first notification of the first partial match and a second notification of the second partial match, wherein the first notification comprises a set of properties of the first event, and the second notification comprises a set of properties of the second event; and a second hardware processor of a second computer system, in communication with the memory, and configured to:

receive the first and the second notifications;

aggregate the first and the second notifications;

evaluate the distributed rule by aggregating, over a sliding time window, the set of properties of the first event and the set of properties of the second event;

determine, based on the event summary data and in response to the aggregation of the set of properties of the first event and the set of properties of the second event exceeding a threshold defined by the distributed rule, a complete match of the distributed rule based on the evaluation; and generate a correlation event.

13. The system of claim 12, wherein the second processor is configured to evaluate the distributed rule by:

determining whether each set of conditions of the distributed rule is satisfied based on the aggregation of the set of properties of the first event and the set of properties of the second event.

14. The system of claim 12, wherein the second processor is configured to:

detect an update to a local copy of a data list; and synchronize a master copy of the data list with the local copy.

15. The system of claim 12, wherein the correlation event comprises:

information associated with base events that trigger the distributed rule.

16. The system of claim 12, wherein the master management device comprises information associated with a plurality of events received by the slave management devices with respect to the distributed rule.

17. A processor-readable non-transitory medium comprising code representing instructions that when executed at a hardware processor of a master management device deployed on a computer hardware platform cause the hardware processor to:

determine a first event of a first subset of events is a first partial match of a distributed rule from a first slave management device, wherein the distributed rule is associated with the master management device;

determine a second event of a second subset of events is a second partial match of the distributed rule from a second slave management device;

receive event summary data comprising properties of events determined to be partial matches of the distributed rule from the first and the second slave management devices;

receive a first notification of the first partial match and a second notification of the second partial match, wherein the notification comprises a set of properties of the first event, and the second notification comprises a set of properties of the second event;

aggregate the first and the second notifications;

evaluate the distributed rule by aggregating, over a sliding time window, the set of properties of the first event and the set of properties of the second event;

determine, based on the event summary data and in response to the aggregation of the set of properties of the first event and the set of properties of the second event exceeding a threshold defined by the distributed rule, a complete match of the distributed rule based on the evaluation; and generate a correlation event.

18. The medium of claim 17, wherein the executed instructions to evaluate the distributed rule comprise executed instructions to:

determine whether each set of conditions of the distributed rule is satisfied based on the aggregation of the set of properties of the first event and the set of properties of the second event.

19. The medium of claim 17, wherein the executed instructions further comprise executed instructions to:

detect an update to a local copy of a data list; and synchronize a master copy of the data list with the local copy.

* * * * *